United States Patent
Ginsberg et al.

(10) Patent No.: US 10,614,325 B1
(45) Date of Patent: Apr. 7, 2020

(54) AUTOMATIC DETECTION OF TRAFFIC SIGNAL STATES FOR DRIVER SAFETY SYSTEM

(71) Applicant: Connected Signals, Inc., Eugene, OR (US)

(72) Inventors: Matthew L. Ginsberg, Eugene, OR (US); Robby Jozef Maria Goetschalckx, Eugene, OR (US)

( * ) Notice: Subject to any disclaimer, the term of this patent is extended or adjusted under 35 U.S.C. 154(b) by 0 days.

(21) Appl. No.: 15/988,376

(22) Filed: May 24, 2018

(51) Int. Cl.
*G08G 1/01* (2006.01)
*G06K 9/00* (2006.01)
*B60W 50/00* (2006.01)
*H04W 4/02* (2018.01)

(52) U.S. Cl.
CPC ..... *G06K 9/00825* (2013.01); *B60W 50/0097* (2013.01); *G08G 1/0141* (2013.01); *H04W 4/027* (2013.01); *B60W 2050/0031* (2013.01); *G08G 1/01* (2013.01); *G08G 1/0112* (2013.01); *G08G 1/0145* (2013.01)

(58) Field of Classification Search
CPC .. G08G 1/0133; G08G 1/0112; G08G 1/0125; G08G 1/0145; G08G 1/07; G08G 1/096716; G01C 21/3492
See application file for complete search history.

(56) References Cited

U.S. PATENT DOCUMENTS

| | | | |
|---|---|---|---|
| 9,697,729 B2 | 7/2017 | Vahidi et al. | |
| 9,852,624 B2 | 12/2017 | Ginsberg et al. | |
| 2014/0285331 A1* | 9/2014 | Otake | G08G 1/16 340/435 |
| 2015/0120175 A1* | 4/2015 | Vahidi | G08G 1/0141 701/119 |
| 2017/0124863 A1* | 5/2017 | Dumazert | G08G 1/0112 |
| 2018/0075739 A1 | 3/2018 | Ginsberg et al. | |
| 2018/0322711 A1* | 11/2018 | Weimerskirch | B60W 20/50 |

OTHER PUBLICATIONS

Fayazi, S.A. et al. "Crowdsourcing Phase and Timing of Pre-Timed Traffic Signals in presence of Queues: Agorithms and Backend System Architecture," IEEE Transactions on Intelligent Transportation Systems, 2016, vol. 17, No. 3, pp. 870-881.

* cited by examiner

Primary Examiner — Benyam Haile

(57) ABSTRACT

A driver safety system estimates a time that a traffic signal transitions (e.g., from red to green) by obtaining location information from a user device in the vehicle at various times and using a physical model of the movement of the vehicle to estimate when the vehicle began to move.

22 Claims, 6 Drawing Sheets

AUTOMATIC DETECTION OF TRAFFIC SIGNAL STATES FOR DRIVER SAFETY SYSTEM

FIELD

The present disclosure relates generally to traffic control, routing and safety systems.

BACKGROUND

Significant reductions in vehicle emissions can be achieved, congestion can be limited, safety can be enhanced and travel times reduced by integrating diverse technology in the vehicular transportation domain. Numerous schemes have been proposed in the past for informing drivers of traffic conditions and presenting them with proposed alternatives when congestion is found. For example, traffic helicopters have been used for decades by radio stations to spot areas of congestion and suggest alternate paths that drivers may wish to consider.

With the growing popularity of GPS and hand-held computing devices, particularly those connected to cellular networks or the internet, other approaches have been used, such as graphical representations of maps with routes being color-coded to indicate levels of congestion.

Another approach to the traffic congestion problem involves "smart" traffic signals (sometimes referred to as traffic lights). For instance, railroad crossings have for decades been tied to traffic signals to help ease the flow of traffic on routes adjacent to railroad crossings when a train approaches. Further, certain systems have been installed that allow emergency vehicles such as fire trucks to change the state of a light from red to green so that the emergency vehicle can cross the intersection quickly with, rather than against, the signal.

In still another related area, various attempts have been made to collect traffic information from drivers who have, for example, GPS-enabled smartphones with them in their vehicles. Systems are emerging that take advantage of the integration of technologies that are available to report traffic information to drivers and suggest routes based on that information, to communicate with traffic signals, and to collect traffic information from drivers. Examples of such systems are disclosed in U.S. Pat. No. 9,852,624, filed as application Ser. No. 15/076,116 on Mar. 21, 2016, entitled "Network Security System with Application for Driver Safety System," the contents of which are incorporated herein by reference as if fully set forth herein.

Further, it has now become commonplace for traffic controls (such as traffic signals) to be networked with a centralized control facility. In this manner, the control facility may both direct operations of traffic signals and, for signals that operate autonomously, receive from the signals indications of their current state (green, amber, red) and expected time of transition to a new state, e.g., current green state will transition to red state (via intermediate transition to amber state) at 10:17:13.3 a.m. local time. Some municipalities even publish for public use such timing and related data. See, e.g., the aforementioned U.S. Pat. No. 9,852,624.

However, such information is not universally available. In some municipalities, such data either do not exist or are not provided for use outside the municipality's public works department or equivalent. In such situations, it would be helpful to determine states of traffic signals independently. One such method is taught in U.S. Patent Publication US 2018/0075739, entitled "Traffic Routing Display System with Multiple Signal Lookahead," the contents of which are incorporated by reference as if fully set forth herein. In that application, images from public webcams are analyzed to identify traffic signals and to obtain from such images indications of the states of such traffic signals.

Some effort has been made to use GPS-detected movement of vehicles to determine when traffic signals are green, and to make assumptions regarding timing of other signals (e.g., similar timing cycles), in order to identify specific timing plans that match best with observations. For example, U.S. Patent Publication US 2015/0120175 uses estimates of average acceleration and deceleration of vehicles approaching and departing from traffic signals to help estimate signal phase durations. See also related paper entitled, CROWD-SOURCING PHASE AND TIMING OF PRE-TIMED TRAFFIC SIGNALS IN PRESENCE OF QUEUES: ALGORITHMS AND BACKEND SYSTEM ARCHITECTURE, S. Alireza Fayazi and Ardlalan Vehidi, Clemson University, Clemson, S.C., available at http://alirezafayazi.com/docs/07323843.pdf.

For various reasons observations of traffic movement do not, in reality, closely correspond to the specific time that a signal turns green. Traffic signal transition times derived from these observations often differ from reality by three seconds or more, and for many applications (e.g., routing decisions and speed recommendations) such differences are significant. Thus, it would be advantageous to have additional methods and systems for determining states of traffic signals, for instance for use by driver safety systems as described herein.

In one particular area addressed by this disclosure, it would be advantageous to use communications from existing user devices such as smartphones to provide sufficient information to a remote processor to allow accurate estimations to be made of when a particular traffic signal transitions, e.g., from red to green.

SUMMARY OF THE DISCLOSURE

A safety enhancement system collects positional data from GPS-enabled devices in vehicles, for example a smartphone running an application reporting on the vehicle's position. Based on positional changes, the time that the traffic signal transitions from one color to another is determined. Other aspects are also disclosed herein.

One skilled in the art will readily recognize from the following discussion that alternative embodiments of the structures and methods illustrated herein may be employed without departing from the principles described herein.

DETAILED DESCRIPTION OF THE EMBODIMENTS

Embodiments disclosed herein provide systems, methods, and computer-readable storage media that use location-based technologies such as GPS or cellular to provide improved traffic control and human safety. Embodiments include one-way or two-way communication via the Internet between user devices and a remote processor. Such user devices report a vehicle's location to the remote processor, which determines based on the vehicle's location at various times an estimate of when a corresponding traffic signal has transitioned from red to green.

Figure 1:
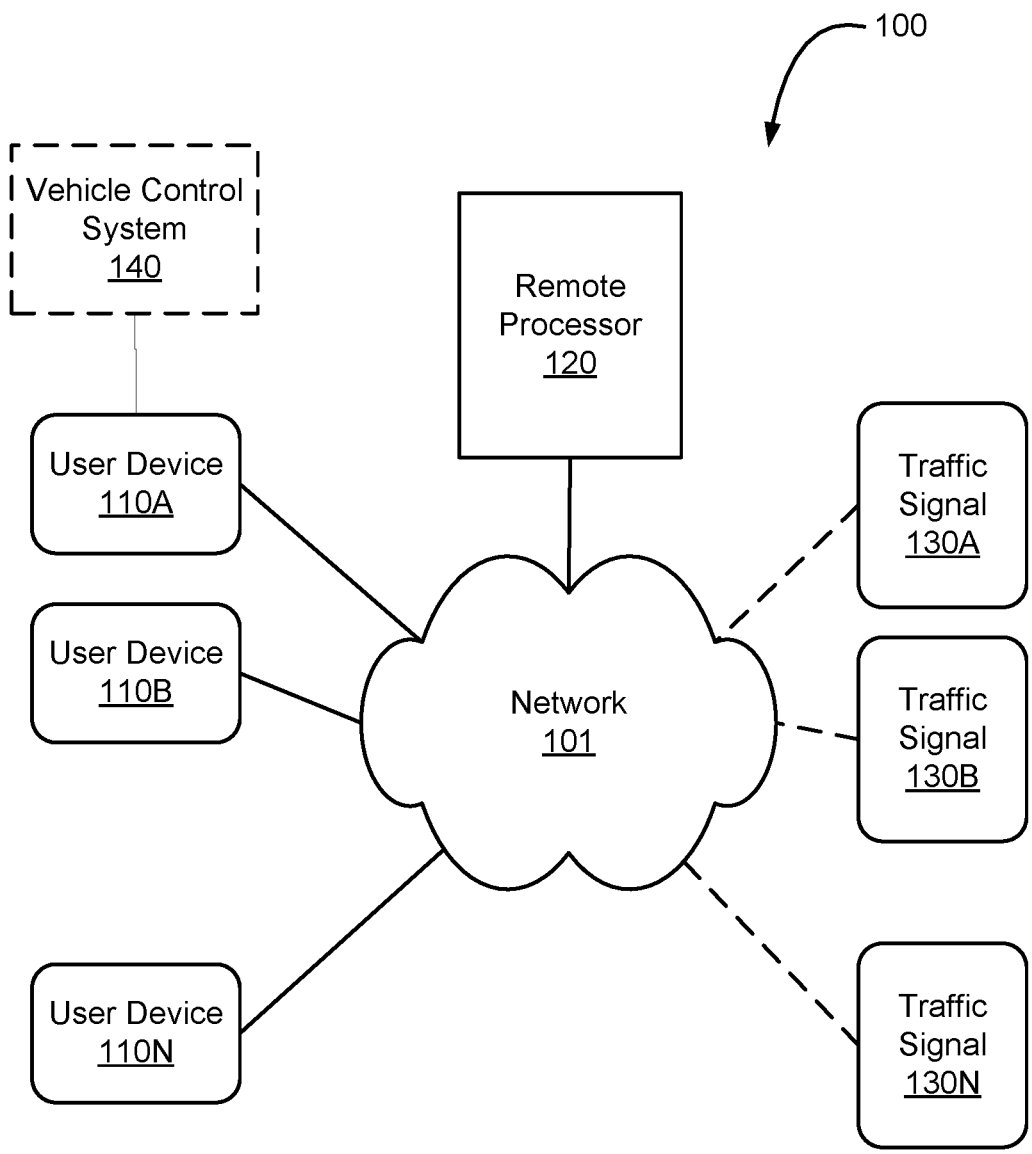
FIG. 1 is a high-level block diagram of a system in accordance with an embodiment described herein.

FIG. 1 is an illustration of one embodiment of such a system 100. The system 100 includes a plurality of user devices 110A-N that are coupled to a network 101. In various embodiments, user devices 110 may include a computer terminal, a personal digital assistant (PDA), a wireless telephone, an on-vehicle computer, or various other user devices capable of connecting to the network 101. In various embodiments, the communications network 101 is a local area network (LAN), a wide area network (WAN), a wireless network, an intranet, or the Internet, for example. In one specific embodiment, user device 110 is an iPhone® device provided by Apple, Inc. and programmed with a user-downloadable application providing one or more of the functions described herein.

The system 100 also includes a plurality of traffic signals 130A-N that may be connected to the network 101 and at least one remote processor 120. In one embodiment, the traffic signals 130A-N are all the traffic signals for all the controlled intersections in a local area. In one implementation, the remote processor 120 manages multiple tasks, including estimating time of traffic signal transitions as well as sending to the traffic signals 130A-N operational commands (e.g., set to four-way red blinking due to some special circumstance). In other implementations, remote processor 120 is entirely distinct from any traffic signal control functions and merely implements the traffic signal transition estimation described below. In some embodiments, a user device, e.g., 110A, further interfaces with a vehicle control system 140, such as via a Bluetooth or wired connection, to control aspects of vehicle operation. In some implementations, each user device 110 performs some or all of the operations described below as being performed by remote processor 120.

Figure 2:
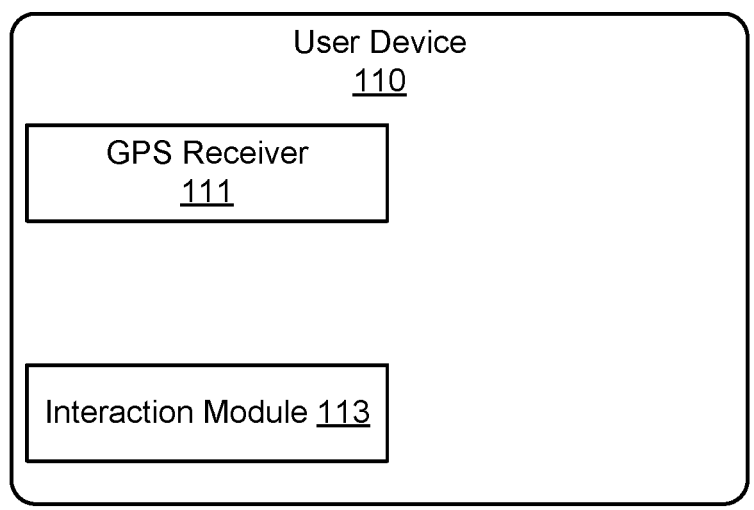
FIG. 2 is a block diagram of the user device of FIG. 1.

FIG. 2 is a block diagram of a user device 110, in accordance with an embodiment of the invention. Referring now to both FIGS. 1 and 2, in one embodiment, a user device (e.g., 110A) is in the vehicle with the driver when in operation in the system 100. A different user device user device (e.g., 110B) may be on the person of a pedestrian or in another vehicle. Note that while the discussion of embodiments herein focuses on automobiles, the systems and methods disclosed can readily be used with trucks, busses, bicycles and other vehicles, as well as with pedestrians and even other types of objects that may move relative to traffic signals or similar controls.

In one embodiment, each user device 110 includes a GPS receiver 111 and an interaction module 113. The GPS receiver 111 of the user device 110 functions to identify a precise location of the user device 110 from GPS satellite system signals received at the user device 110. Suitable GPS receivers are commonly found in handheld computing devices such as cell phones, on-board navigation systems, and other electronics. The GPS receiver 111 determines the location of the user device 110 for communication to the remote processor 120 via interaction module 113. Alternatively, cellular signals or other known location-determining technologies may be used to determine the position of the user device 110. For clarity, the location is discussed herein as having been determined from GPS signals although cellular signals or other technologies can be used in alternate embodiments.

The controller interaction module 113 of the user device 110 manages communication between the user device 110 and the remote processor 120. Specifically, the controller interaction module 113 sends the location information determined by the GPS receiver 111 to the remote processor 120 and may optionally also receive messages from remote processor 120 regarding traffic, navigation routes, traffic signals, and the like. In various implementations, the functions of remote processor 120 may in actuality be spread among multiple devices, for instance one under the authority of a municipality and another under the authority of a private company; some such functions may even be processed directly by user device 110.

Figure 6:
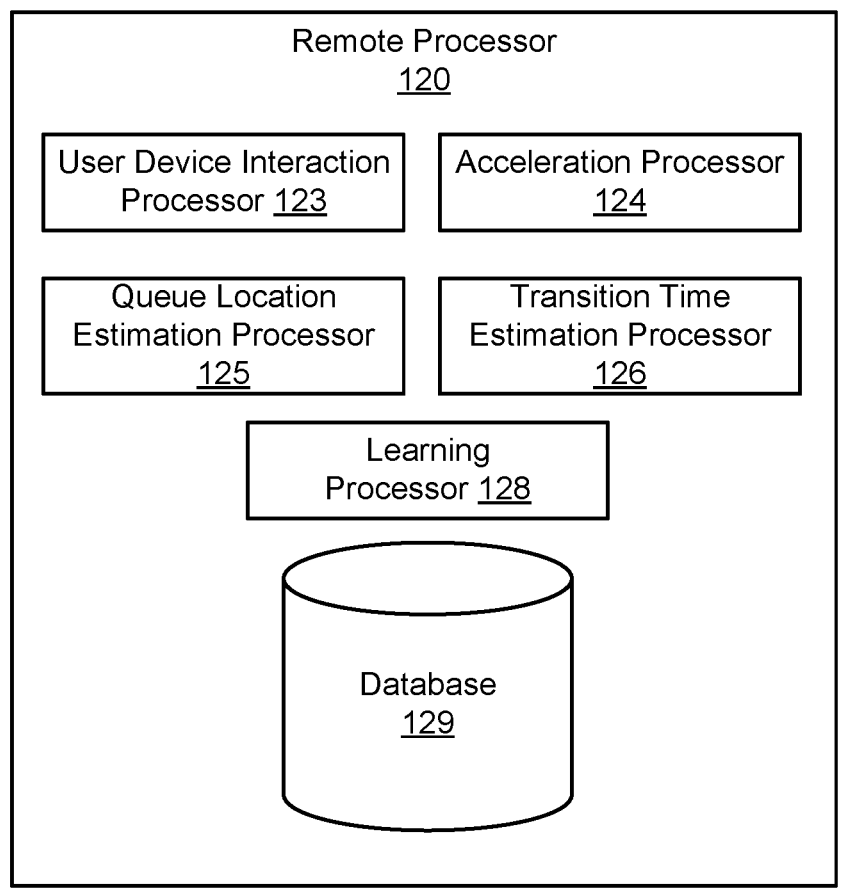
FIG. 6 is a block diagram of the remote processor of FIG. 1.

Referring now to FIG. 6, subsystems of remote processor 120 are detailed. A user device interaction processor 123 includes network communication facilities to allow communications with user device 110 in a vehicle, for instance, receipt of location information at various times. An acceleration processor 124 is a computing subsystem that determines, based on such location information, acceleration of the vehicle (e.g., after a traffic signal turns green) as detailed below. In some embodiments, as described below, acceleration is determined not based on location, but on some other basis (e.g., GPS-reported instantaneous velocity, GPS-reported instantaneous acceleration or a static assumptions regarding parameters such as acceleration and likely final speed). Queue location estimation processor 125 is a computing subsystem that, in some embodiments, is included in system 100 to determine whether, based on the position data, a vehicle is likely the first in queue at a traffic signal, second in queue, or further back. This information is usable to determine with greater accuracy the likely lag time between when a traffic signal transitions to green and when the vehicle actually begins to move (vehicles further back in the queue will begin moving after those closer to the intersection). Transition time estimation processor 126 is a computing subsystem that estimates when a traffic signal transitioned (e.g., from red to green) based on the positional data received from the vehicle at various times, as detailed below. Learning processor 128 and database 129 are computing subsystems that collect, over time, information such as observed transition times and that generate aggregated data based on those observations, which aggregated data are usable to tune a multivariate physical model of a vehicle moving over time, as detailed below. For instance, a traffic signal near a retirement community may typically have drivers with longer actual lag times than one in an area with a younger demographic. Drivers may have longer lag times during certain periods of the day than others, as well (whether due to distracted driving behavior or otherwise). In other embodiments, learning processor 128 uses machine learning (via direct observation, deep learning or other methods) to adjust processing weights and location/time values to minimize aggregate difference between predicted and actual values for traffic signal transitions (e.g., by use of actual observations of a traffic signal contemporaneous with received location data).

Figure 3:
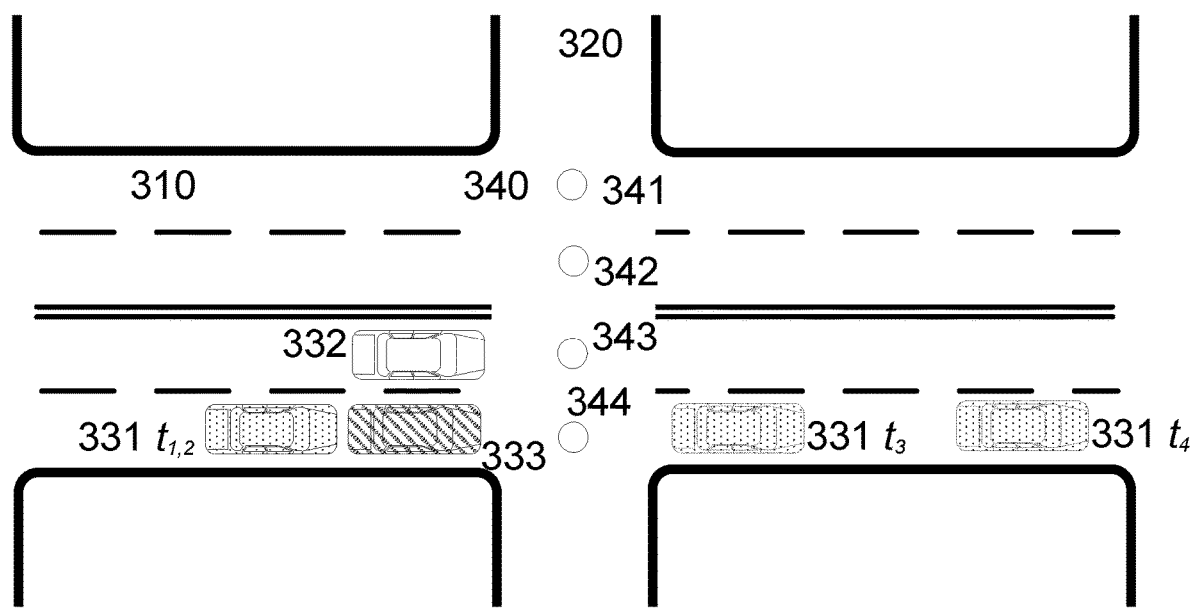
FIG. 3 illustrates a signalized intersection, for which estimation is accomplished in accordance with an embodiment described herein.

Operation of such a system can be understood by considering FIG. 3, which illustrates a signalized roadway intersection 340. An east-west road 310 and a north-south road 320 have an intersection 340 controlled by four east-west traffic signals 341-344. In the specific situation shown, three vehicles 331-333 are eastbound being controlled by signals 343-344.

Assume for purposes of this discussion that signals 343 and 344 are identically timed, as is common at an intersection 340 as shown in FIG. 3. Consider in particular vehicle 331, which in this instance is equipped with a user device 110. In practice, vehicle 331 will likely be the last of the three vehicles to begin moving (other than by a trivial "creep" distance) once signals 343 and 344 transition to a green light. Both normal human reaction time and driver inattention of vehicle 333 may prevent vehicle 331 from moving for a non-negligible time once signal 344 transitions to green. Thus, merely identifying when vehicle 331 begins to move is not a direct proxy for determining when signal 344 has transitioned to green. That said, such information remains usable as one input for such determination.

User device 110 is configured, in one embodiment, to repeatedly send position data to remote processor 120. In some embodiments, the position data are sent at regular intervals, for instance every ten seconds, based on factors such as the available communications bandwidth and cost of communications. In other embodiments position data are sent based on a threshold movement distance, for instance every 30 meters, based again on communications constraints as previously described. In still other embodiments, a combination of time and distance factors are used.

Thus, if vehicle 331 is stopped at intersection 340, it may report its position as shown by 331 $t_{1,2}$. After the light turns green, it may report its position as shown by 331 $t_3$ and then 331 $t_4$.

In some embodiments, user device 110 also reports instantaneous speed or acceleration (or both), while in other instances these factors are determined by the multiple positional reports alone.

Modern GPS systems such as used in user device 110 have a sufficient positional accuracy such that by conventional machine learning over time, sufficiently accurate predictions can be made regarding whether a vehicle is the first at the intersection queue (e.g., 332), the second (331) or further back. While long vehicles such as tandem trucks may from time to time complicate such predictions, in practice longer vehicles have essentially equivalent intersection clearance times with multiple smaller vehicles that accelerate more briskly, so this difference is not relevant.

Such information from user device 110 is then used to estimate when signal 344 actually transitioned to green. With the information described above, multiple techniques can be used to do this. In some embodiments, only one technique is used; in others multiple techniques are used. In still others, where multiple vehicles are simultaneously at an intersection, these techniques are used with respect to each such vehicle and averaged to achieve greater accuracy.

Furthermore, even information regarding position over time of cross-traffic (i.e., those vehicles on north-south road 320) is usable in some embodiments to help determine green light timing.

Figure 4:
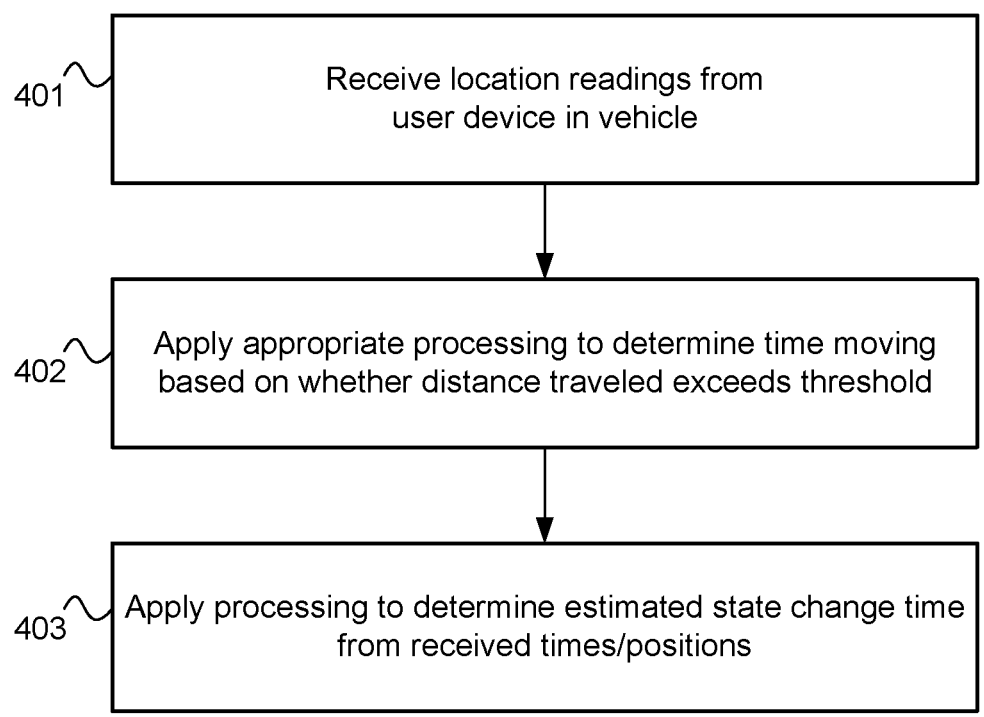
FIG. 4 is a flow diagram of processing in accordance with an embodiment described herein.

Referring now to FIG. 4, an exemplary method is described.

In this method, user device 110 is assumed to provide only location information on its associated vehicle 331, which information is assumed to be sufficient to determine whether vehicle 331 is the first vehicle waiting at the intersection, the second vehicle (as shown in FIG. 3), or otherwise.

Specifically, we assume that when a light changes from red to green, there is a wait time w before any traffic moves at all. Once traffic starts moving, we assume that the ability to move travels backward from the light at a speed m. When a given car is able to move, we assume that it accelerates with a uniform acceleration a until a target speed s is reached.

The method commences by receiving 401 information regarding the location of a vehicle over time, assumed for current purposes to be with relatively large granularity (e.g., ten seconds between samples). Denote, for example, four consecutive position samples involving points $p_1$ through $p_4$ occurring at times $t_1$ through $t_4$ (corresponding to FIG. 3). Suppose also that $p_1 = p_2$ (so that vehicle 331 is stationary at time $t_2$) and that $p_3 \neq p_4$ (so that vehicle 331 is moving at time $t_3$).

In order to determine the time at which traffic signal 344 changed from red to green, we first simplify the notation by denoting by d the distance between $p_2$ and $p_3$. We further denote by Δ the distance between $p_2$ and traffic signal 344. If $d \leq s^2/2a$, then vehicle 331 will not have had enough room to accelerate to the target speed s, and it follows that the total time spent moving is $$t_{moving} = \sqrt{\frac{2d}{a}}$$

If, on the other hand, $$d \geq \frac{s^2}{2a},$$

a little bit of algebra shows that $$t_{moving} = \frac{d}{s} + \frac{s}{2a}$$

Accordingly, $t_{moving}$ is determined 402 based on whether this threshold is exceeded. In either case, the time at which traffic signal 344 can be expected to have changed is initially determined 403 by $$t = t_3 - t_{moving} - w - \frac{\Delta}{m}$$

Experimentation shows that individual estimates obtained in this fashion generally have an expected error of approximately three seconds relative to when the signal actually transitioned. Aggregated estimates across multiple light changes can be expected to have substantially reduced error, thus improving on accuracy.

Selection of values for w, m, a and s (in the example detailed here) or for whatever values parameterize the assumed physics of the vehicle's motion (in the more general case) is accomplished by collecting data for which the actual times of the traffic signal changes are known, and then selecting parameter values for which the mean squared error (or in other embodiments other measures of error magnitude such as the sum of error absolute values) between the predicted and actual times is minimized.

In another embodiment, user device 110 provides not only location information but directly provides instantaneous speed information as well. In this instance, the values used to estimate the time of the traffic signal transition are determined not based merely on the GPS location information, but based on GPS-provided instantaneous velocity as well.

In yet another embodiment, user device 110 provides not only location and speed information, but instantaneous acceleration information as well. Where this is available, this actual information is used rather than the derived acceleration value described above. In some circumstances, such GPS-obtained parameters may not be available or may not be desirable to use for other reasons; in such situations a proxy can be applied instead. For example, there may be instances in which lack of GPS data may cause acceleration processor 124 to simply apply a static proxy that assumes, e.g., an acceleration from a traffic signal of 2 m/sec$^2$ until a target speed equal to the speed limit of the road (say, 25 mph) is reached.

In still another embodiment, multiple user devices 110 from multiple vehicles (e.g., 331, 333) are simultaneously available and each reports location and optionally speed/acceleration data as described above. In this instance, estimates of the time that traffic signal 344 transitioned are determined based on each vehicle and then averaged to obtain a more accurate estimate. In some embodiments, a weighting function is applied to recognize that data from the first vehicle queued (333) is more likely to be accurate than that from vehicles further back in the queue (e.g., 331), since the more forward vehicles are less susceptible to random delays due to vehicles in front of them.

For embodiments in which the goal is to determine an overall phase/timing scheme for a traffic signal, estimates as described above are aggregated over time, and standard data analysis techniques are used to determine multimodal distributions (e.g., indicating changes in signal patterns for rush hour, late night, weekend modes), obtaining for each such mode a timing pattern.

In some embodiments, it may also be helpful to determine likely patterns for a traffic signal, e.g., eastbound control of traffic on road 310, by obtaining similar time/position/speed/acceleration data from cross traffic (e.g., a vehicle traveling southbound on road 320. For example, other than some pedestrian crossing modes and four-way blinking red or yellow modes, it is unusual for a traffic signal to show the same color to orthogonally positioned vehicles. Thus, by estimating times that cross-traffic on road 320 comes to a stop at intersection 340, using methods corresponding to those described above, may provide helpful insights into when traffic signal 333 displays a green light to eastbound vehicles on road 310.

Likewise, in some embodiments pedestrian implications can be determined, for instance by identifying times when both north/south and east/west signals are set to red. Such indications are usable to either identify multimodal distributions or simply to identify estimates that should be discarded because they suggest an anomalous situation that should not be considered in estimating normal cycle times.

Further, those skilled in the art will recognize that the methods and systems described herein may be combined with other known techniques for characterizing nearby signals, e.g., via webcam-based systems that may display only a subset of a municipality's traffic signals.

The traffic signals 130 may be programmed with a set of default rules for timing of the light cycles based on time of day, day of week, etc. In one embodiment, these default rules are subject to be changed based on instructions received from a corresponding controller. In other embodiments, the remote processor 120, acting as a controller, instructs the signal module 131 of the traffic signal 130 with respect to every change in status of the light. In yet another embodiment, the remote processor 120 does not influence the operation of the traffic signal. System 100 is capable of estimating traffic signal transitions without access to any a priori knowledge of how such lights are controlled, and in particular over time system 100 can quickly determine when a particular signal has changed modes, for instance, from rush hour to nighttime mode.

Implementation of some features described herein requires less than all of the subsystems and modules described above. For example, in practice it is found that good estimates of traffic signal transition times can be achieved using solely position and time data to model the physical movement of the vehicle and simply adding in a static expected lag time. Particularly if such estimates are made with numerous vehicles over time and then averaged, the additional complexity from seeking velocity/acceleration data directly from each user device, or trying to determine queued position of each vehicle, can be avoided.

Figure 5:
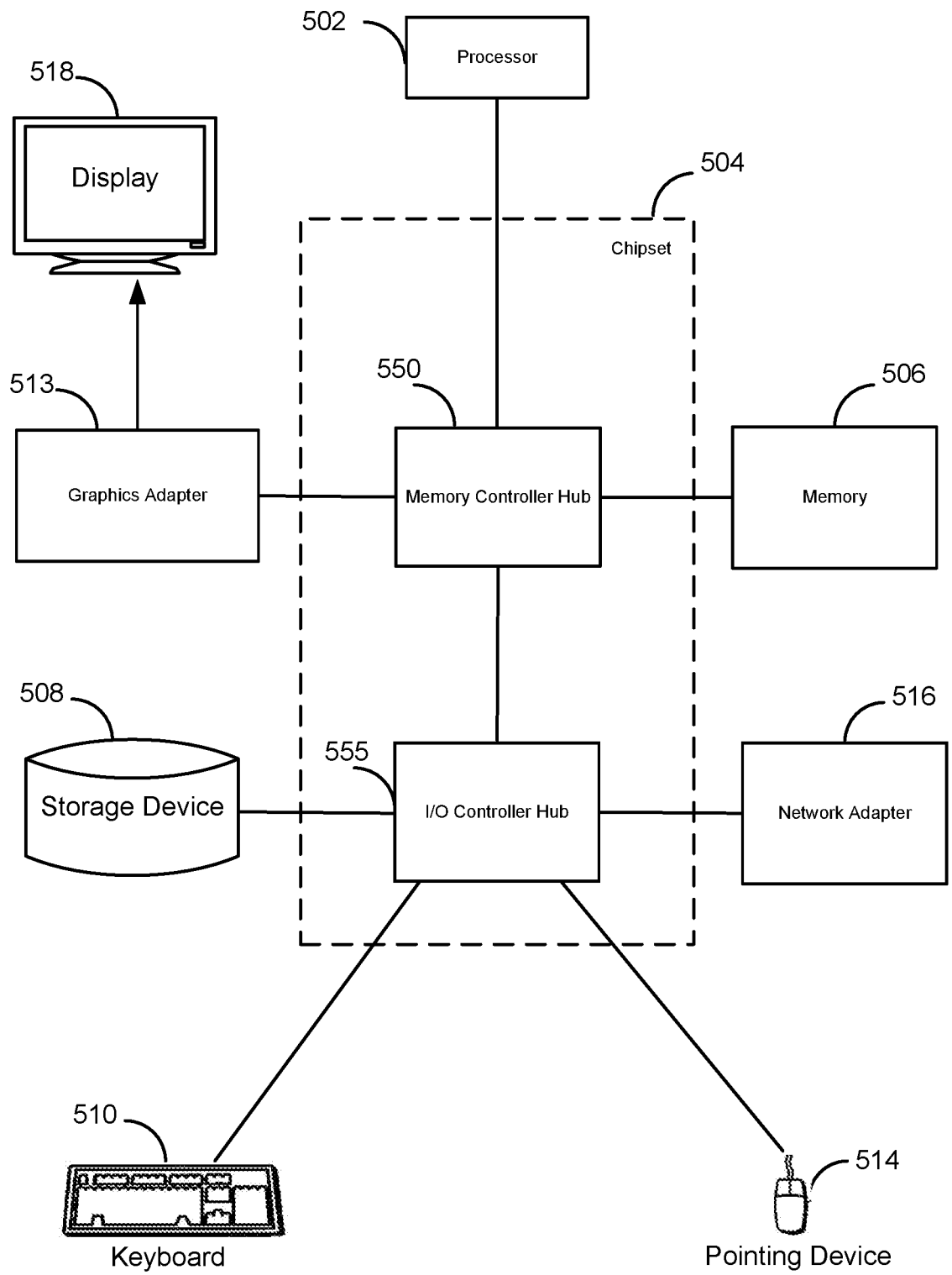
FIG. 5 is a block diagram illustrating an example of a computer for use as a user device or a remote processor, in accordance with an embodiment described herein.

FIG. 5 is high-level block diagram illustrating an example of a computer 500 for use as a user device 110 or a remote processor 120 in accordance with an embodiment of system 100. Illustrated are at least one processor 502 coupled to a chipset 504. The chipset 504 includes a memory controller hub 550 and an input/output (I/O) controller hub 555. A memory 506 and a graphics adapter 513 are coupled to the memory controller hub 550, and a display device 518 is coupled to the graphics adapter 513. A storage device 508, keyboard 510, pointing device 514, and network adapter 516 are coupled to the I/O controller hub 555. Other embodiments of the computer 500 have different architectures. For example, the memory 506 is directly coupled to the processor 502 in some embodiments.

The storage device 508 is a computer-readable storage medium such as a hard drive, compact disk read-only memory (CD-ROM), DVD, or a solid-state memory device. The memory 506 holds instructions and data used by the processor 502. The pointing device 514 is a mouse, track ball, or other type of pointing device, and in some embodiments is used in combination with the keyboard 510 to input data into the computer system 500. The graphics adapter 513 displays images and other information on the display device 518. In some embodiments, the display device 518 includes a touch screen capability for receiving user input and selections. The network adapter 516 couples the computer system 500 to the network 101. Some embodiments of the computer 500 have different and/or other components than those shown in FIG. 5.

The computer 500 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The types of computers 500 used by the entities of FIG. 1 can vary depending upon the embodiment and the processing power used by the entity. For example, a user device 110 that is a PDA typically has limited processing power, a small display 518, and might lack a pointing device 514. The remote processor 120, in contrast, may comprise multiple blade servers working together to provide the functionality described herein. The portion of data storage and processing performed by each device is preferably based in part on the processing power and available communication bandwidth for each such device.

It should be noted that the discussion above has focused on traffic signals (i.e., traffic lights) as the traffic controls, but the disclosure here applies to other types of traffic controls as well. For instance, some school areas have speed limits that change over the course of a day; some freeway entrances have metering lights that may be on or off depending on how much traffic is present. The disclosed systems and methods here can also be applied to certain static traffic controls, such as stop signs that are applicable only during certain hours. For instance, some intersections allow a right turning lane to continue without a stop except during rush hours.

It should also be noted that the systems and methods discussed herein can readily be adapted to other useful functions, thus increasing the value of use of the system. In addition to safety measures, energy efficiency can also be enhanced using these systems and methods. For example, with user device 110A being connected to vehicle control system 140, it is a simple matter to automatically shut off a vehicle's engine if the user is approaching or already stopped at an intersection that will have a red light lasting for a duration above some threshold. Depending on the type of vehicle (e.g., fuel cell, hybrid gas-electric, diesel) the duration of a stop for which it will be beneficial from an environmental or engine life perspective to turn off the engine will differ, and the system described herein readily allows programmatic control to optimize among various such parameters.

The present disclosure has been provided in particular detail with respect to several possible embodiments. Those of skill in the art will appreciate that other embodiments may be practiced as well. The particular naming of the components, capitalization of terms, the attributes, data structures, or any other programming or structural aspect is not mandatory or significant, and the mechanisms that implement any particular embodiment or its features may have different names, formats, or protocols. Further, the embodiments may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

The present disclosure references apparatus for performing certain operations. In some circumstances, the disclosure indicates that such apparatus is specially constructed for the required purposes; other aspects may comprise a general-purpose computer selectively activated or reconfigured by a computer program stored on a computer readable medium that can be accessed by the computer and run by a computer processor. Such a computer program may be stored in a computer readable storage medium, such as, but is not limited to, solid state drives, physical disk drives (e.g., magnetic disks, optical disks, CD-ROMs, magnetic-optical disks), read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present disclosure should not be read to be limited to any particular programming language. It is appreciated that a variety of programming languages may be used to implement the teachings as described herein, and any references to specific languages are provided for enablement and best mode.

The embodiments disclosed are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A system for estimating a transition time of a traffic signal, comprising:
   a user device, wherein the user device obtains location information of an object at various times, the object being proximate to the traffic signal;
   a remote device coupled to the user device comprising:
      an interaction processor adapted to receive location information from the user device;
      an acceleration processor adapted to determine a movement model of the object at a subset of the various times, wherein the movement model includes a wait time before individual cars start moving after the traffic signal changes from red to green, said wait time increasing for cars that are further from the traffic signal in a given lane; and
      a transition time estimation processor, adapted to accept as input the location information and the movement model, and to determine therefrom an estimate of a transition time of the traffic signal.

2. The system of claim 1, wherein the transition time processor is further adapted to accept as input a time lag estimate from a lag processor, the time lag estimate corresponding to an expected difference between the transition time of the traffic signal and movement thereafter of the object.

3. The system of claim 1, further comprising a learning processor operatively coupled to the acceleration processor and a database, the learning processor adapted to collect light transition data for storage in the database and to aggregate the light transition data for use by the acceleration processor.

4. The system of claim 1, further comprising a queue location estimation processor operatively coupled to the user device interaction processor, the queue location estimation processor adapted to estimate a queue location for the vehicle based on the location information, the queue location adapted for application by the transition time estimation processor to adjust the estimate of the transition time.

5. The system of claim 4, further comprising a lag processor operatively coupled to the queue location estimation processor, the lag processor adapted to take as input the queue location and provide as output a time lag estimate.

6. The system of claim 1, wherein the movement model includes acceleration.

7. The system of claim 1, wherein the object is a vehicle.

8. The system of claim 1, wherein the object is a pedestrian.

9. The system of claim 1, wherein the subset corresponds to at least one time at which the object as not yet passed the traffic signal and another time at which the object has passed the traffic signal.

10. The system of claim 1, wherein the transition time of the traffic signal is a time at which the signal transitions from red to green.

11. The system of claim 1, wherein the transition time of the traffic signal is a time at which the signal transitions from green to red.

12. A computer-implemented method of estimating a transition time of a traffic signal, comprising:
receiving, from a user device, location information of an object at various times, the object being proximate to the traffic signal;
applying, via a processor, a movement model of the movement of the object based on the location information to determine an expected time that the object began to move, wherein the movement model includes a wait time before individual cars start moving after the traffic signal changes from red to green, said wait time increasing for cars that are further from the traffic signal in a given lane; and
estimating the transition time of the traffic signal from the expected time that the object began to move.

13. The computer-implemented method of claim 12, wherein the movement model includes estimation of acceleration of the object from the location information at the various times.

14. The computer-implemented method of claim 12, wherein the various times include at least one time at which the vehicle has not yet passed the traffic signal and another time at which the vehicle has passed the traffic signal.

15. The computer-implemented method of claim 12, further comprising collecting lag data for storage in a database and aggregating the lag data to determine a difference between when the traffic light transitioned and when the object began to move.

16. The computer-implemented method of claim 12, further comprising estimating a queue location for the object based on the location information and adjusting the expected transition time based on the queue location.

17. The computer-implemented method of claim 12, wherein the object is a vehicle.

18. The computer-implemented method of claim 12, wherein the object is a pedestrian.

19. The computer-implemented method of claim 12, further comprising aggregating movement model parameters of additional objects to tune the movement model.

20. The computer-implemented method of claim 12, further comprising comparing actual observation of the traffic signal with the estimated transition time to tune the movement model.

21. The computer-implemented method of claim 12, wherein the transition time of the traffic signal is a time at which the signal transitions from red to green.

22. The computer-implemented method of claim 12, wherein the transition time of the traffic signal is a time at which the signal transitions from green to red.

* * * * *